(12) United States Patent
Stewart et al.

(10) Patent No.: US 12,264,574 B2
(45) Date of Patent: Apr. 1, 2025

(54) VISUAL INSPECTION SYSTEM AND METHOD FOR MONITORING ANNULAR ENVIRONMENT

(71) Applicant: Expro North Sea Limited, Reading (GB)

(72) Inventors: Chris Stewart, Aberdeen (GB); David Lowery, Houston, TX (US); Hannah Stewart, Aberdeen (GB); Dylan Johnston, Stirling (GB)

(73) Assignee: EXPRO NORTH SEA LIMITED, Reading (GB)

( * ) Notice: Subject to any disclaimer, the term of this patent is extended or adjusted under 35 U.S.C. 154(b) by 98 days.

(21) Appl. No.: 18/333,587

(22) Filed: Jun. 13, 2023

(65) Prior Publication Data
US 2024/0418074 A1 Dec. 19, 2024

(51) Int. Cl.
*E21B 47/002* (2012.01)
*G02B 23/24* (2006.01)

(52) U.S. Cl.
CPC ........ *E21B 47/002* (2020.05); *G02B 23/2484* (2013.01)

(58) Field of Classification Search
CPC .................................................... E21B 47/002
See application file for complete search history.

(56) References Cited

U.S. PATENT DOCUMENTS

| 5,927,405 A | 7/1999 | Monjure et al. |
| 10,227,859 B2 | 3/2019 | Richards et al. |
| 2010/0018721 A1 | 1/2010 | Jennings et al. |

OTHER PUBLICATIONS

GB Combined Search and Examination Report dated Oct. 23, 2024, GB Application No. 2407367.8, 5 pages.

*Primary Examiner* — Young Lee
(74) *Attorney, Agent, or Firm* — MH2 Technology Law Group, LLP

(57) ABSTRACT

A visual inspection system intended for inspection of the difficult to reach lateral wellhead ports and annulus is provided. The inspection of the annular ports is carried out prior to running a simplified annulus intervention system. The imaging assembly of the visual inspection system of the present invention can be manoeuvred to view and capture images of remote, inaccessible, difficult to reach locations in the lateral access port and the adjacent annular region, prior to running of annulus intervention system, thus enhancing the success rate of carrying out annulus interventions and increasing safety by increasing the efficiency of well intervention operations and reducing the risk of unintended incidents.

13 Claims, 14 Drawing Sheets

VISUAL INSPECTION SYSTEM AND METHOD FOR MONITORING ANNULAR ENVIRONMENT

BACKGROUND OF THE INVENTION

1. Technical Field

The present disclosure relates to an inspection system using a visual inspection means such as a camera, intended for inspection of the difficult to reach lateral access ports and a portion of the outermost casing annular cavity located adjacent to the ports in an oil or gas well. Systems and methods of the present invention are capable of visually surveying the lateral access port and the adjacent annulus environment, whereby the complex annular region can be accessed. The inspection of the annulus ports in particular, may be carried out prior to running a simplified annulus intervention system. The visual inspection system of the present invention provides for images of remote, inaccessible, difficult to reach locations in the lateral access port and the adjacent annular, prior to running of annulus intervention system thus enhancing the success rate of carrying out annulus interventions and increasing safety by increasing the efficiency of well intervention operations and reducing the risk of unintended incidents. With the reduction of safety hazards, the carbon footprint of intervention operations is also reduced, thus resulting in environmental and safety benefits.

2. Background Information

In the oil and gas industry, well bores are often monitored to ascertain the details of the completion behaviour. For example, it is beneficial to obtain visual access to the difficult to reach lateral access ports of the wellhead and a portion of the outermost casing annular cavity located adjacent annulus environment. It is crucial to know the structural and behavioural details of the individual annulus ports and the annular area, prior to running annulus intervention systems, for example. A particular disadvantage of conventional survey tools is that the inspection process using conventional tools is cumbersome, time consuming, not accurate and yet not able to provide access to the exact situation of the annular environment. This is particularly true because the process requires use an intricate system that can access the remotely located annular environment and a multitude of optical imaging tools that need to deployed into the well separately.

As an example, typically, at first instance, US Publications 20170138171 and 20210222539 provide for identification of a subterranean event using Eulerian video magnification. Video enhancement techniques are used to magnify the appearance of ovement, color changes, sounds, time and other characteristics in video. Here the camera is installed at a vantage point pointed towards the surface adjacent (e.g., above) the subterranean event where a movement of waves or a blast would hinder taking of image, but an enhanced video would be able to provide the video that would be not have been visually perceptible otherwise. Such systems analyse the downhole anomaly with computer vision and artificial intelligence, in real time. but are not suitable when images of the remote and difficult to reach areas of the wellbore are required. In other patents such as U.S. Pat. No. 4,855,820, U.S. Pat. No. 5,134,471and others, the camera assembly gets lowered into a borehole by means of a cable to monitor the borehole walls. Such camera assemblies are bulky and so this requires lowering of heavy equipment into the wellbore, and are thus not suitable for intricate matters. Other downhole visualisation techniques known in the art use sensor data indicative of downhole physical parameters in real-time by running a downhole tool comprising sensors and using downhole data processing means for processing the sensor signals to provide sensor data. An uphole data processing means would be required for uphole processing and visualisation, and a data communication link to convey the sensor data from the downhole data processing means to the uphole data processing means would be required. Such elaborate equipment have only limited accessibility and are complicated to use, expensive to run, and cumbersome to deploy or move.

Owing to the complex position and nature of the wellbore annulus, existing techniques have failed to give the desired results with respect to accessing the annular regions of the wellbore. For example, surface based equipment may have the ability to procure images through various imagers known the art and are also frequently used, such as the Ultrasonic Borehole Imager, the Formation Microscanner or the Geo Vision resistivity tool. However, such devices cannot be applicable to the complex, cased hole environments, nor can they be adapted to run in conjunction with simplified annulus intervention systems.

Thus, there is a need for a visual inspection system such that an optical imaging insertion assembly can be propelled to view the annular region of the wellbore environment, such that the imaging assembly can be manoeuvred to view and capture the desired images of the required area for the purpose of surveys and inspections. The lateral access ports and the annular cavity are difficult to reach and view due to the complex location of these regions. What is needed is system and method for running an optical imaging insertion assembly that can inspect the annular region of down hole environments, one that is able to provide images of difficult to reach annular areas relative to existing systems, and one that can be cost effectively produced.

SUMMARY

According to an aspect of the present disclosure, an annular inspection system is provided to be run in conjunction with a simplified annulus intervention procedure. The annular inspection system includes a visual inspection means such as a camera insertion system that includes a camera and a light source assembly to ensure clear imagery. The camera and light source assembly is installed onto the distal end of an annulus intervention apparatus and extended for visual inspection of the annular region.

In one aspect of the invention, the visual inspection system is run to allow the camera insertion system to be stroked in under pressure, through relevant gate valves to the annulus area. The visual inspection system is configured for inspection of lateral access ports and a portion of the outermost casing annular cavity located adjacent to the port.

In any of the aspects or embodiments described above and herein, the camera may include a pressure housing with outer diameter sufficient to allow it to be run into standard wellhead ports. The pressure housing seats on an adaptor assembly of the wellhead, such that, the pressure housing interfaces with the adaptor assembly to seal the pressure housing on to the adaptor assembly.

In any of the aspects or embodiments described above and herein, the camera insertion system is installed onto the distal end of the shaft of an annulus hose insertion apparatus. The shaft gets extended to position the camera and light source assembly onto the annulus and the shaft is capable of being projected forwardly and rotated as it is extended creating a helix that provides full coverage of the inner surfaces of the valve, the entryway and the annulus, for a complete 360 deg. view of the annular region. The shaft is also capable of spot rotations at points of interest and these features are used to investigate specific areas in the annulus as the shaft is extended and projected forwardly. After the required images have been captured, the shaft is retracted to withdraw the camera and light source assembly out of the annulus space and back through the valve.

In any of the aspects or embodiments described above and herein, the visual inspection system is designed with a short stroke version and a long stroke version to accommodate survey demands prior to such operations.

In any of the aspects or embodiments described above and herein, the sensor may be cylindrically configured. The inner plate may have an inner diameter surface and an outer diameter surface, and the inner diameter surface defines the interior cavity. The electrical insulator may be attached to a first portion of inner plate outer diameter surface disposed radially between the inner plate and the first outer plate and attached to a second portion of inner plate outer diameter surface disposed radially between the inner plate and the second outer plate.

In any of the aspects or embodiments described above and herein, the wherein the camera is a battery-operated memory camera and captures images at set intervals. The light source is an LED light incorporated in the device to ensure clear imagery is captured.

In any of the aspects or embodiments described above and herein, the visual inspection system includes a first window that allows light to be transmitted from the light source to a target region within the lateral port, valve attached thereto and the annular space adjacent to the port in a borehole and a second window that allows for the passage of reflected light from the target region to the camera.

In any of the aspects or embodiments described above and herein, the annular inspection system may be operable to inspect the annulus ports prior to running a simplified annulus intervention system.

In any of the aspects or embodiments described above and herein, the camera insertion system may have an outer diameter that is not greater than the port inner diameter to facilitate ease of camera insertion system installation.

In any of the aspects or embodiments described above and herein, the method may include installing and operating the visual inspection system to provide images indicative of lateral access ports and a portion of the outermost casing annular cavity located adjacent to the port in the annular region.

The foregoing has outlined several aspects of the present invention in order that the detailed description of the invention that follows may be better understood. Additional features and advantages of the invention will be described hereinafter which form the subject of the claims of the invention.

DETAILED DESCRIPTION

Figure 1A:
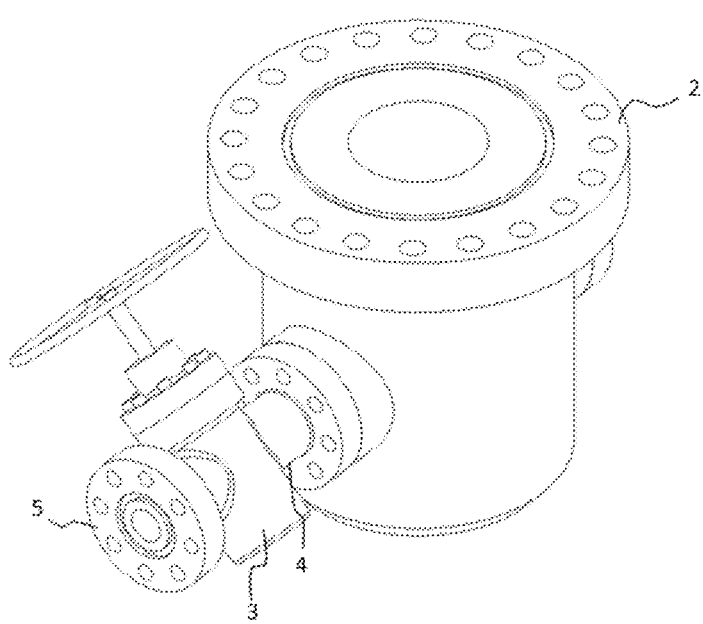
FIG. 1A illustrates a perspective view of a wellhead with an annulus port including a valve attached thereto.

Reference will now be made in detail to embodiments of the present teachings, examples of which are illustrated in the accompanying drawing. In the drawings, like reference numerals have been used throughout to designate identical elements, where convenient. The following description is merely a representative example of such teachings.

Figure 1B:
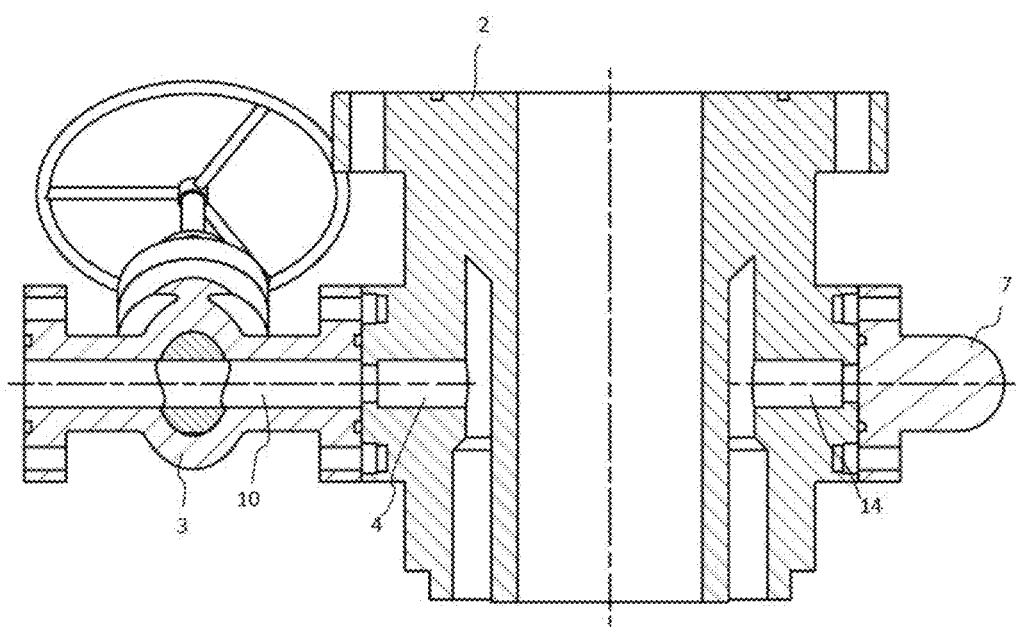
FIG. 1B illustrates a sectional view of the wellhead and valve of FIG. 1.
Figure 2:
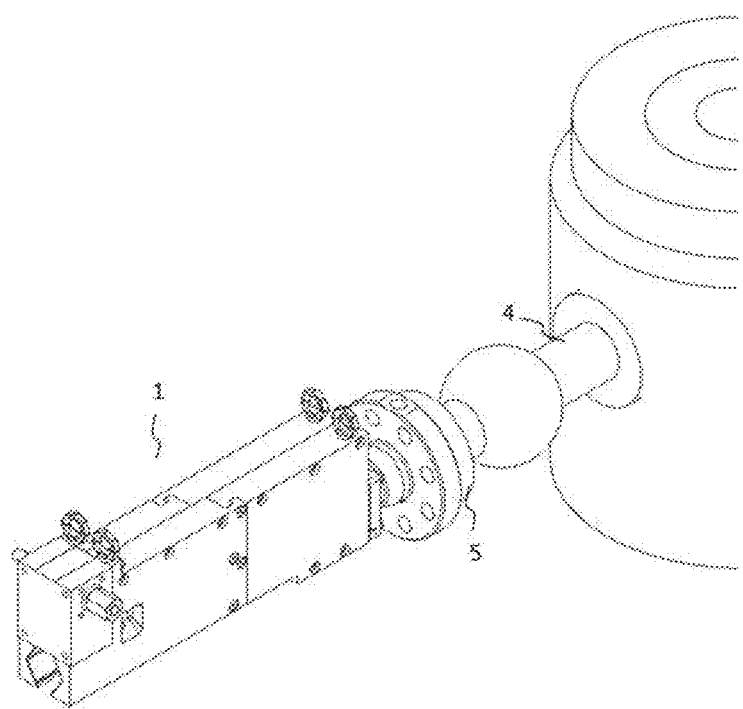
FIG. 2 illustrates a wellhead assembly of FIGS. 1A and 1B shown with annulus hose insertion apparatus attached to the outboard flange of annulus valve.

According to aspects of the present disclosure, FIG. 1A diagrammatically illustrates an apparatus comprising a tool 1. The tool 1 is connected to a wellhead 2. The wellhead 2 is of a standard construction of a wellhead and has annulus port 4 and a valve 3 attached thereto. The valve 3 is normally a gate valve, which when closed shuts off access from the outside to the annulus port 4. In some known designs of wellhead, the annulus port 4 includes a thread, able to receive a plug. In these systems, the plug closes the annulus port 4 and seals the annular cavity from the valve 3. This can allow the valve 3 to be removed and replaced if desired. When is it desired to gain access to the annulus 18, the valve 3 is opened and a tool is inserted through the valve passageway 10 to engage with the head of the plug to unscrew it. The tool latches onto the head with the aid of a circumferential groove in the head and so is able to withdraw the plug once unscrewed. Thus, access to the annulus via the annulus port 4 is achieved. The system also allows for the plug, or a replacement plug, to be passed along the valve passageway whilst held by the tool and then screwed into position in the annulus port 4. FIG. 1B illustrates a sectional view of the valve of FIG. 1A, which shows a second annulus port 14 oriented 180 deg. from the annulus port 4 with valve 3 attached. The second port is shown with a bull plug 7 installed to seal off the second annulus port 14. FIG. 2 shows the wellhead assembly of FIGS. 1A and 1B with tool 1 attached to the outboard flange 5 of the annulus valve 3. To facilitate the description herein, the aforesaid structure will be referred to hereinafter generically as annulus hose insertion apparatus 1.

Figure 3A:
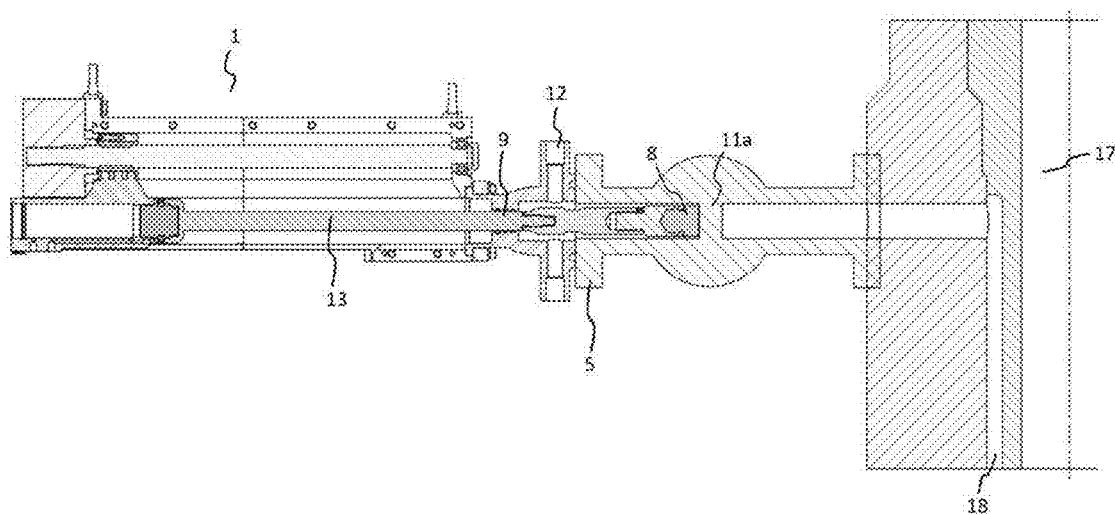
FIG. 3A illustrates a sectional view showing annulus hose insertion apparatus attached to outboard flange of valve.

As seen in FIG. 3A, the annulus hose insertion apparatus 1 is attached to outboard flange 5 of valve 3. The annulus hose insertion apparatus shaft 13 is initially shown as retracted with drift 8 attached to the end of the shaft 13. The drift 8 is a circular gauge of a specific diameter which is associated with the minimum through diameter of a specific tubular or passageway. Full extension of the shaft 13 with the drift 8 attached is only achievable when there is no debris or an obstruction in the valve body, the port between the valve body and the annulus directly ahead of the port.

Figure 3B:
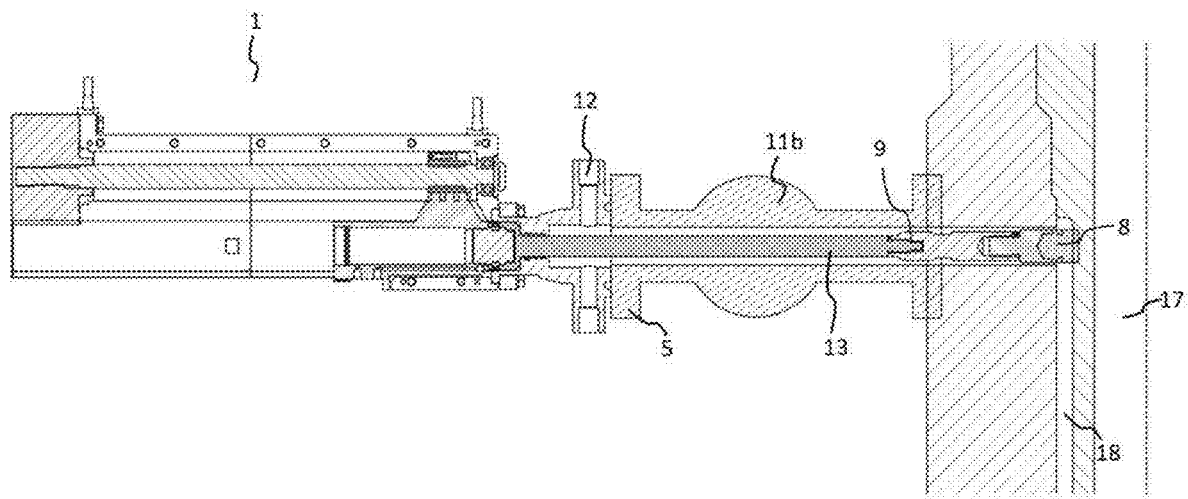
FIG. 3B illustrates a sectional view of FIG. 3A with annulus hose insertion apparatus shaft extended, thereby positioning the drift into the annulus.

Further, FIG. 3 B illustrates a sectional view of FIG. 3A illustrating aspects of the present disclosure where the annulus hose insertion apparatus shaft 13 is extended, thereby positioning the drift 8 into the annulus 18. Full extension indicates that there is no debris or obstruction present in the valve or passageway between the valve and the annulus. If the annulus 18 is pressurized it may be necessary to avoid discharging gas and or fluids which may result in a bleed down of the annulus pressure to the atmosphere. In such cases the stuffing box seal 9 maintains a seal between the stuffing box seals 9 and the closed annulus port valve. Once the valve is opened any pressure within the annulus is subsequently trapped at the stuffing box thus allowing for passage of the shaft and drift through the valve. When withdrawing the annulus hose insertion apparatus shaft 13, the shaft 13 is withdrawn partially through the valve 3 and the valve 3 is closed prior to withdrawing the shaft 13 fully with the drift 8 being withdrawn past the valve 3. This step-by-step process keeps annular pressure trapped in the annulus 18 until it is deemed acceptable to discharge fluid or gas allowing the annulus pressure to bleed down.

Figure 4:
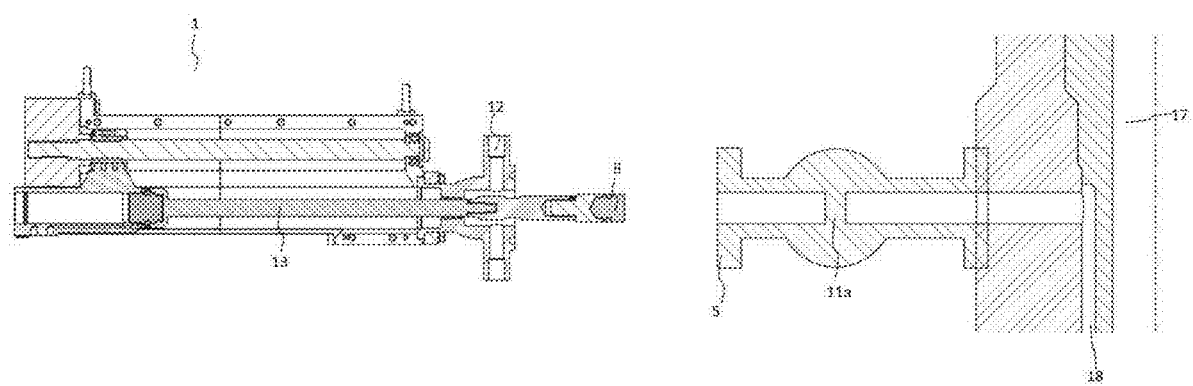
FIG. 4 illustrates a sectional view showing the annulus hose insertion apparatus head removed from outboard flange of valve after the drift run into the annulus port is complete, in order to allow for removal of drift head.

To illustrate, FIG. 4 shows the annulus hose insertion apparatus head removed from outboard flange 5 of valve 3 after the drift run into the annulus port is complete in order to allow for removal of drift head. The results of the drift run will dictate one of two available next steps in the process of installing and deploying an annulus hose insertion apparatus. Step I: If the drift 8 is able to be run full depth indicating that there are no obstructions or debris at the entryway to the annulus port or within the annulus projecting directly ahead of the port the next step in the process is to install the camera insertion system 19 into the distal end of the shaft 13 of the annulus hose insertion apparatus 1. Once the camera insertion system 19 is installed, the annulus hose insertion apparatus 1 is reattached to the outboard flange 5 of the valve 3. The camera insertion system 19 extends into the annulus port it is able to inspect the annulus 18 using the process described with FIGS. 3 A and 3B and as will be further described in detail in FIGS. 5A, 5B and 6.

Step II: If the drift 8 is not able to be run full depth indicating that there is an obstruction or debris at the entryway to the annulus port or within the annulus projecting directly ahead of the port, the next step in the process is to install lead impression block or a needle impression block in order to obtain dimensional and shape information related to any debris or structural anomalies that are present at the entryway into the annulus 18. If an impression block run is required, the drift head is removed at this step and an impression block is attached to the distal end of the annulus hose insertion apparatus shaft. Once the impression block has been attached the entire annulus hose insertion apparatus 1 is reattached to the outboard flange 5 of the annulus port valve as shown in FIG. 2. Once the annulus hose insertion apparatus 1 has been reattached, the shaft 13 is extended using the process described in FIGS. 3A and 3B. If the annulus remains pressurized at this point, the step-by-step process of extending the shaft 13 while maintaining a seal 9 between stuffing box and the annulus valve detailed in FIG. 3B will be employed to extend the shaft.

Figure 5A:
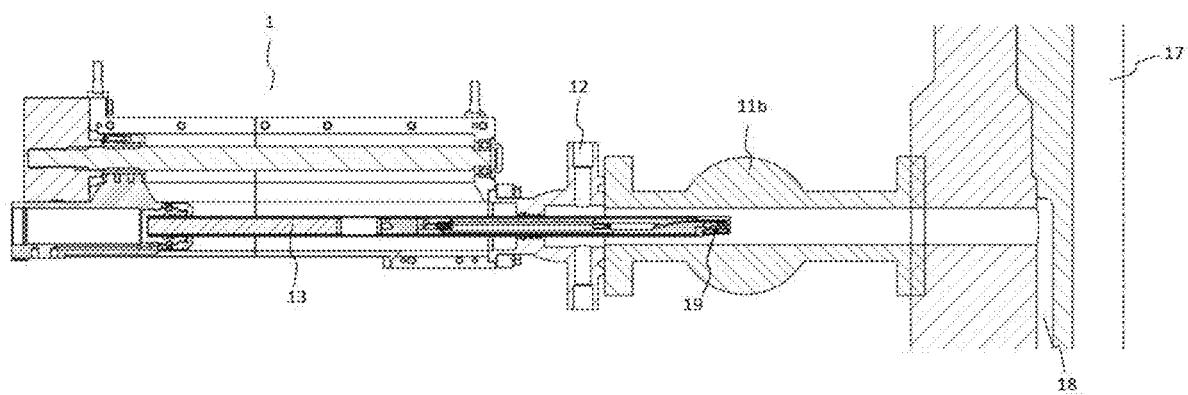
FIG. 5A illustrates the next step after FIG. 4, where the annulus hose insertion apparatus shaft is extended and the camera and light source assembly is installed onto the distal end of the annulus hose insertion apparatus shaft.

In FIG. 5A once the annulus port and annulus 18 directly ahead of the port are determined to be clear, the camera insertion assembly 19 is installed onto the distal end of the annulus hose insertion apparatus shaft 13 and the shaft 13 is extended. As the camera insertion assembly 19 is extended and projected forward, video inspection of the inner passageway through the valve and entryway into the anulus is carried out. If the annulus remains pressurized at this point, the step-by-step process of extending the shaft 13 while maintaining a seal 9 between stuffing box and the annulus valve detailed in FIG. 3B will be employed to extend the shaft.

Figure 5B:
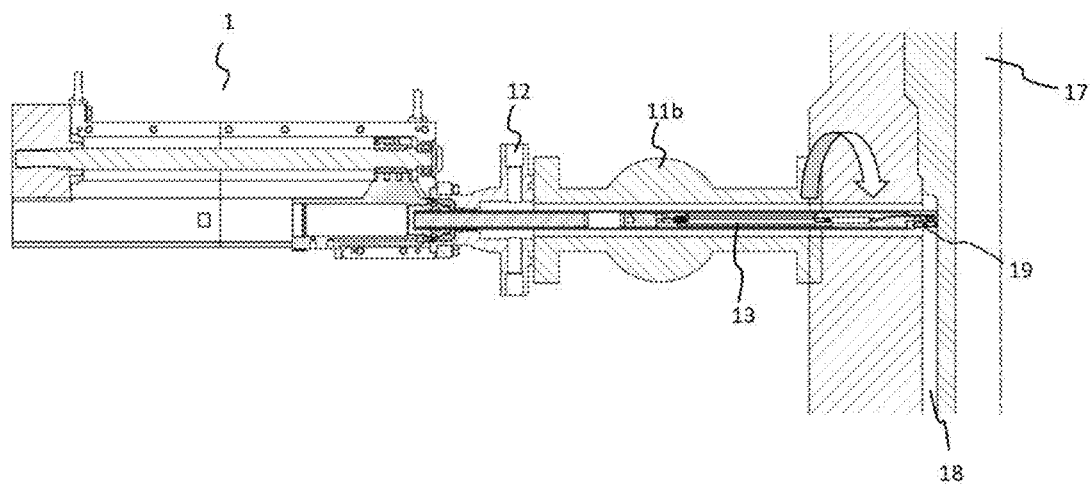
FIG. 5B illustrates the next step where the annulus hose insertion apparatus shaft is fully extended and projected forwardly to position the camera and light source assembly into the annulus.

Further, in FIG. 5B the annulus hose insertion apparatus shaft is shown fully extended and projected forwardly such that the camera insertion assembly has the ability to be rotated 360 degrees in order to get images of the full area. To obtain complete images the shaft 13 may be rotated as it is extended creating a helix that provides a full 360 degree coverage of the inner surfaces of the valve, the entryway and the annulus. If full coverage is not required, spot rotations at points of interest may be used to investigate specific points of interest as the shaft 13 is extended and projected forwardly. Any debris that is identified in the video inspection may be flushed free by pumping fluid through the annulus hose insertion apparatus wash port 12 to produce fluid flow from the annulus hose insertion apparatus 1 to a secondary annulus port that allows for fluid flow out of the annulus.

Figure 6:
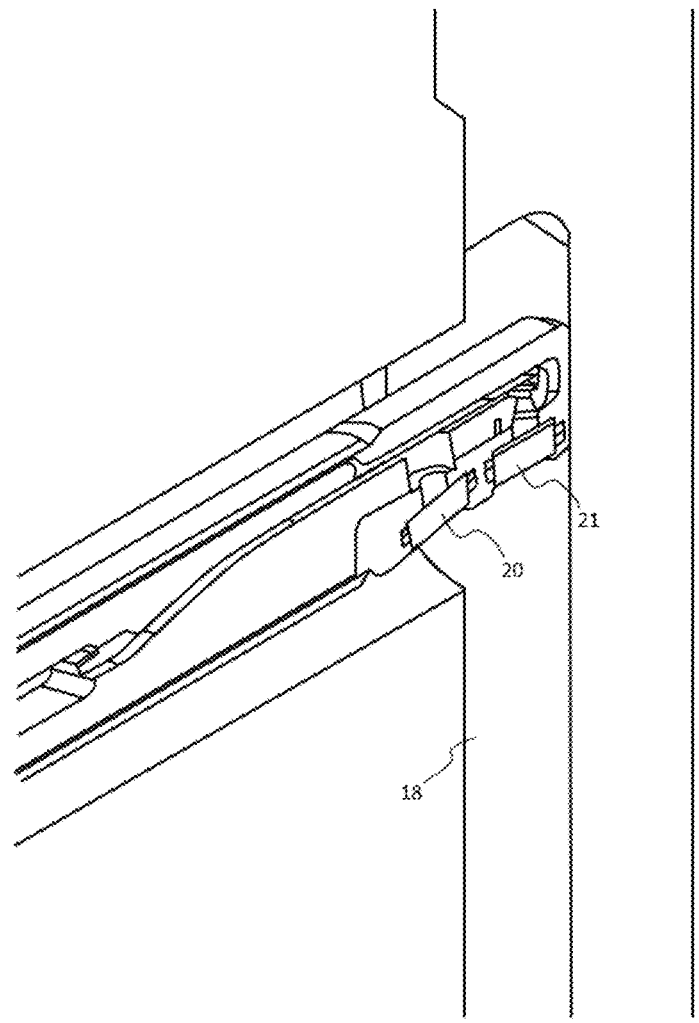
FIG. 6 illustrates a close-up view of camera and light source positioned over the annulus looking vertically downward.

Referring to FIG. 6, a non-limiting example of a camera insertion assembly 19 embodiment is shown in a close-up view where the camera insertion assembly 19 is positioned over the annulus 18 looking vertically downward. The camera insertion assembly 19 includes a camera 20 and a light source 21 which is an LED light. Once the camera insertion assembly 19 gets installed, there will be no natural light, therefore the light source 21 is important to be incorporated to ensure clear imagery is captured. In FIG. 6C, the camera 20 is at an angle providing optimum filed of view with the light source 21 providing suitable illumination. Images can be captured during the stroke in/out of the camera. Additionally once in desired position—for example at the hanger area, the annulus intervention tool has the ability to be rotated 360 degrees in order to get images of the full area. This is done by rotating the body of the annulus intervention tool (which is in turn locked to the camera) and pausing at each desired angle in order to obtain suitable images.

In an embodiment, the camera 20 is a battery-operated memory camera that allows entry to a pressurised annulus in order to obtain photographs of the desired annulus port location at set intervals. The annulus intervention tool used in conjunction with the camera 20 provides the mechanical gearbox in order to drive in and out the pressure housing of the camera 20. Once retracted and removed from the wellhead the images can be downloaded via a memory card and reviewed.

Stroke IN operation is defined as: Operating the annulus intervention tool screw jack to stroke the camera pressure housing INTO the annulus.

Stroke OUT operation is defined as: Operating the annulus intervention tool screw jack to stroke the camera pressure housing OUT of the annulus.

Figure 7:
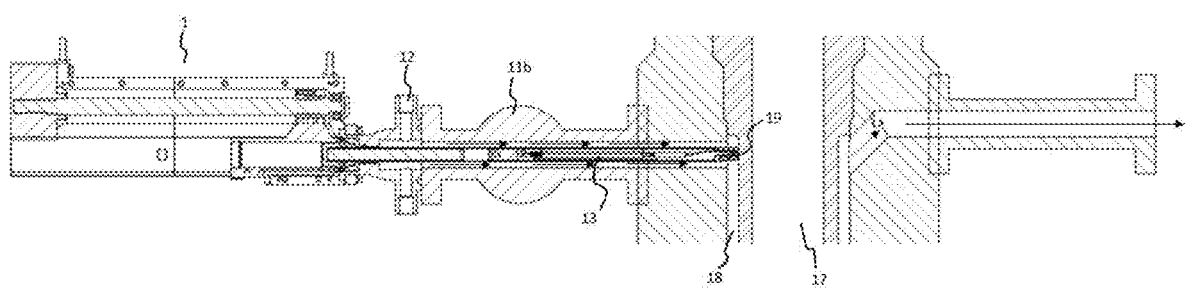
FIG. 7 illustrates a sectional view showing the annulus hose insertion apparatus with camera extended into the annulus port.

FIG. 7 is a sectional view showing the annulus hose insertion apparatus 1 with the camera insertion assembly 19 extended into the annulus port 18. In the event that the debris or sludge obstructs the view of the camera 20, the wash port 12 of the annulus hose insertion device allows for fluid to be pumped into the annulus while the camera insertion assembly 19 is in position. The flow of fluid into the wash port 12 can be seen in FIG. 7, and arrows indicate the path of fluid flow from the wash port 12, past the camera insertion assembly 19, to the outlet on the opposite side of the wellhead. This allows debris or sludge to be removed from the area of interest.

Figure 8:
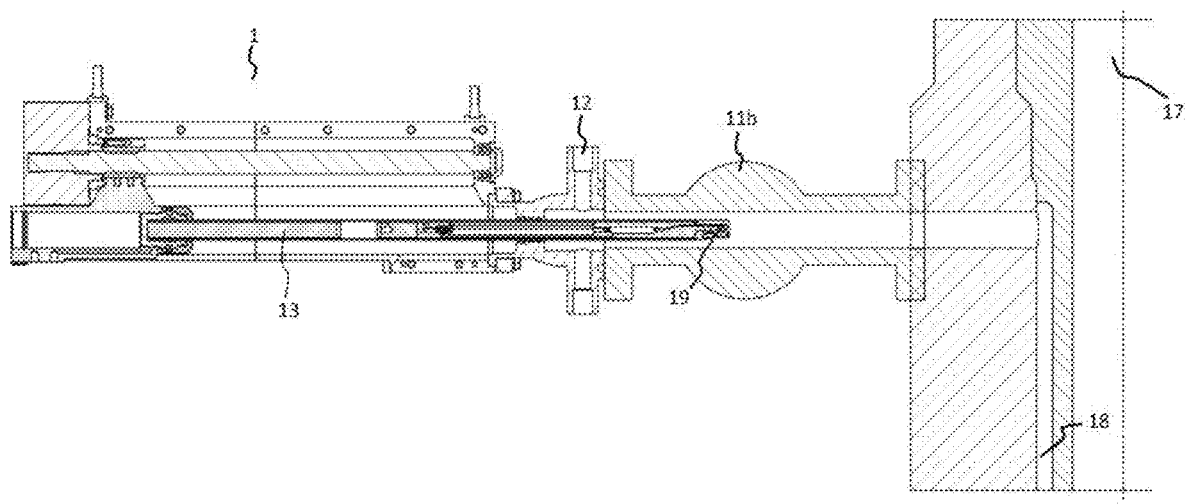
FIG. 8 illustrates a shows shaft being retracted so as to withdraw the camera and light source assembly out of the annulus space and back through the valve.
Figure 9:
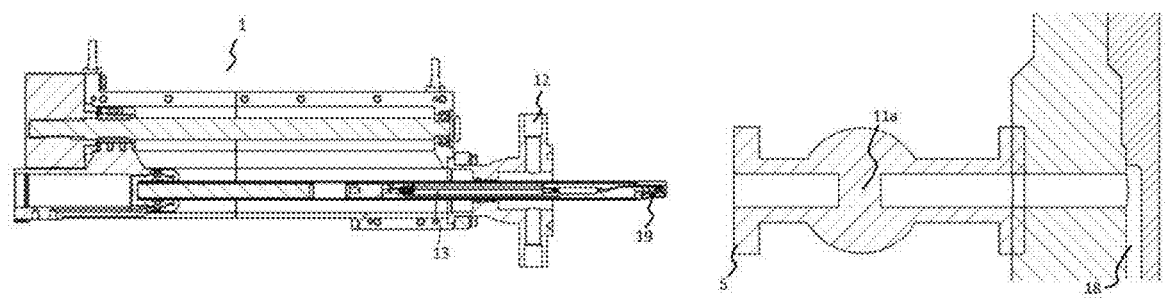
FIG. 9 illustrates a sectional view showing annulus hose insertion apparatus detached from the annulus valve flange to allow for detachment of the camera and light source assembly and attachment of the annulus hose insertion apparatus.
Figure 10:
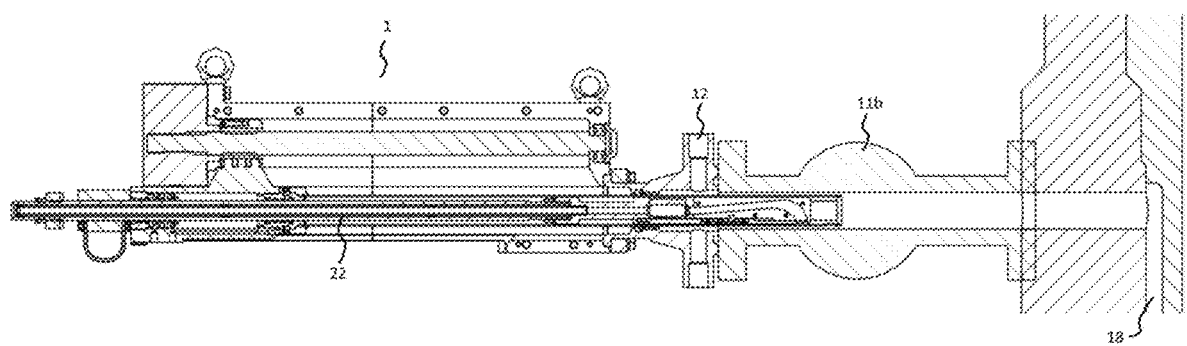
FIG. 10 illustrates a sectional view showing annulus hose insertion apparatus attached to the valve flange. The annulus hose insertion apparatus shaft is shown retracted in this view.

In FIG. 8 the shaft 13 is shown as being retracted so as to withdraw the camera insertion assembly 19 out of the annulus 18 and back through the valve. If annulus pressure is still present, the valve may be closed after passage of the camera insertion assembly 19. If the annulus remains pressurized at this point the step by step process of retracting the shaft through the valve while maintaining pressure between the stuffing box seal 9 and the annulus valve will be employed in this step similar to the reverse of the FIG. 3 steps. Then in FIG. 9 the annulus hose insertion apparatus 1 is detached from the annulus valve flange 5 to allow for detachment of the camera insertion assembly 19 and attachment of the annulus hose insertion apparatus 1. In FIG. 10, the annulus hose insertion apparatus 1 is seen attached to the valve flange 5. The annulus hose insertion apparatus shaft 13 is shown retracted in this view. If the annulus remains pressurized at this point the step-by-step process of extending the shaft 13 through the stuffing box and the annulus valve detailed in the description of FIG. 3 will be employed in this step similar to the FIG. 3 steps.

Figure 11:
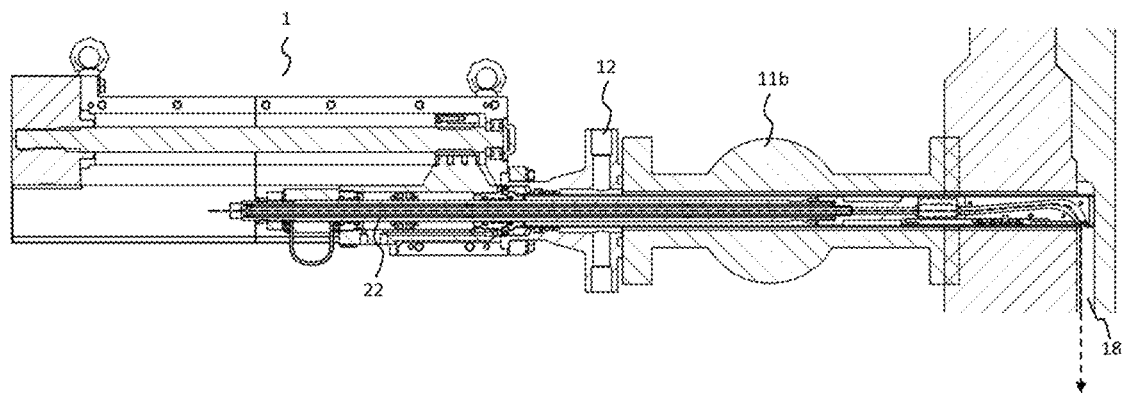
FIG. 11 illustrates a sectional view showing annulus hose insertion apparatus attached to the valve flange and the wellspring hose (shown in dashed lines) being fed through the insertion apparatus, through the valve and vertically downward into the annulus.

Finally in FIG. 11, the annulus hose insertion apparatus 1 is attached to the valve flange 5 and the annulus intervention system hose 22, shown as dashed line, being fed through the insertion apparatus 1, through the valve and vertically downward into the annulus 18.

As used herein, the terms "inner" and "outer"; "up" and "down"; "upper" and "lower"; "upward" and "downward"; "above" and "below"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The terms "first", "second", "third", etc. when referring to several elements is meant to differentiate between the elements for the sake of clarity, but not to imply an order, nor a particular number of elements. For example, the recitation of a "second" element does not imply that a "first" of the same element is also present, unless otherwise specifically stated.

Although the invention has been described in the above in connection with preferred embodiments of the invention, it will be evident for a person skilled in the art that several modifications are conceivable without departing from the invention as defined by the following claims.

The invention claimed is:

1. A visual inspection system for inspection of lateral wellhead inlet ports and an outermost casing annulus adjacent to a port in oil, gas, and/or geothermal wells, comprising:
   a camera insertion system that includes a camera and a light source assembly to inspect a lateral access port of a wellhead,
   wherein the camera and light source assembly are configured to be propelled to inspect the lateral access port and a valve attached thereto and to an annular space adjacent to an annular access port, such that the visual inspection is performed in conjunction with an annulus intervention procedure,
   wherein the visual insertion system is run in conjunction with an annulus hose insertion apparatus to allow the visual inspection system to be stroked in under pressure, through relevant gate valves to view an annulus area, such that the visual inspection system inspects the annulus access port prior to running the annulus intervention system,
   wherein the annulus hose insertion apparatus has a shaft that is configured to extend such that the camera and light source assembly is installed onto the distal end of the shaft,
   wherein the shaft is configured to project forwardly to traverse the camera and light source assembly through the lateral access port and any valve attached thereto and into the annulus, and
   wherein the shaft is configured to be rotated as it is extended creating a helix that provides full coverage of inner surfaces of the valve, an entryway, and the annulus area and spot rotations at points of interest to investigate specific areas as the shaft is extended.

2. The visual inspection system of claim 1, wherein lateral wellhead inlet ports and the outermost casing annulus adjacent to the port may be inspected while maintaining annulus pressure as the visual inspection system is being inserted, functioned and removed.

3. The visual inspection system of claim 1, wherein the camera insertion system comprises:
   a pressure housing with an interface adapter to facilitate attachment of the housing to a standard wellhead port or pressure containment valve attached thereto,
   wherein the attachment provides structural support and pressure containment between the insertion system and the port.

4. The visual inspection system of claim 1, wherein the inspection system is designed with a short stroke version and a long stroke version to accommodate survey demands prior to such operations.

5. The system of claim 1, wherein the camera is a battery-operated memory camera, the camera captures images at set intervals and
the light source is an LED light incorporated in the device to ensure clear imagery is captured.

6. The visual inspection system of claim 1, further comprising:
a first window that allows light to be transmitted from the light source to a target region within the lateral port, valve attached thereto and the annular space adjacent to the port in a borehole; and
a second window that allows for the passage of reflected light from the target region to the camera.

7. A method for visual inspection of lateral wellhead inlet ports and an outermost casing annulus adjacent to a port in oil gas, and/or geothermal wells, comprising:
securing a camera insertion system that includes a camera and light source assembly to a lateral access port of a wellhead,
wherein the camera and light source assembly are configured to be propelled to inspect the lateral access port and a valve attached thereto and view an annular space adjacent to an annular access port, such that the visual inspection is performed in conjunction with an annulus intervention procedure,
wherein the visual insertion system is run in conjunction with an annulus hose insertion apparatus to allow the visual inspection system to be stroked in under pressure, through relevant gate valves to view an annulus area, such that the visual inspection system inspects the annulus access port prior to running the annulus intervention system,
wherein the annulus hose insertion apparatus has a shaft that is configured to extend such that the camera and light source assembly is installed onto the distal end of the shaft,
wherein the shaft is configured to project forwardly to traverse the camera and light source assembly through the lateral access port and any valve attached thereto and into the annulus, and
wherein the shaft is configured to be rotated as it is extended creating a helix that provides full coverage of inner surfaces of the valve, an entryway, and the annulus area and spot rotations at points of interest to investigate specific areas as the shaft is extended.

8. The method as claimed in claim 7, wherein the method comprises:
connecting the annulus hose insertion apparatus to the wellhead;
extending the shaft of annulus hose insertion apparatus; and
installing the camera and light source assembly onto the distal end of the shaft.

9. The method of claim 8, wherein the method further comprises:
projecting forwardly the shaft to traverse the camera and light source assembly through the lateral access port and any valve attached thereto and into the annular space; and
rotating the shaft as it is extended and projected forwardly to create the helix that provides full coverage of the inner surfaces of the valve, the entryway, and the annulus area, and spot rotations at the points of interest to investigate the specific areas as the shaft is extended.

10. An apparatus for visual inspection of lateral wellhead inlet ports and an outermost casing annulus adjacent to a port in oil, gas, and/or geothermal wells, comprising:
a camera insertion system that includes a camera and a light source assembly to inspect a lateral access port of a wellhead,
wherein the camera and light source assembly are configured to be propelled to inspect the lateral access port and a valve attached thereto and view an annular space adjacent to an annular access port, such that the visual inspection is performed in conjunction with an annulus intervention procedure,
wherein the visual insertion system is run in conjunction with an annulus hose insertion apparatus to allow the visual inspection system to be stroked in under pressure, through relevant gate valves to view an annulus area, such that the visual inspection system inspects the annulus access port prior to running the annulus intervention system,
wherein the annulus hose insertion apparatus has a shaft that is configured to extend such that the camera and light source assembly is installed onto the distal end of the shaft,
wherein the shaft is configured to project forwardly to traverse the camera and light source assembly through the lateral access port and any valve attached thereto and into the annulus, and
wherein the shaft is configured to be rotated as it is extended creating a helix that provides full coverage of inner surfaces of the valve, an entryway, and the annulus area and spot rotations at points of interest to investigate specific areas as the shaft is extended.

11. The apparatus as claimed in claim 10, wherein the camera insertion system comprises:
a pressure housing with an interface adapter to facilitate attachment of the housing to a standard wellhead port or pressure containment valve attached thereto,
wherein the attachment provides structural support and pressure containment between the insertion system and the port.

12. The apparatus as claimed in claim 10, wherein the camera is a battery-operated memory camera,
the camera captures images at set intervals and
the light source is an LED light incorporated in the device.

13. The apparatus as claimed in claim 10, further comprising:
a first window that allows light to be transmitted from the light source to a target region within the lateral port, valve attached thereto and the annular space adjacent to the port in a borehole; and
a second window that allows for the passage of reflected light from the target region to the camera.

* * * * *